(12) United States Patent  
Park et al.

(10) Patent No.: US 12,529,798 B2
(45) Date of Patent: Jan. 20, 2026

(54) APPARATUS AND METHOD FOR MODULARIZING DUPLEX SYSTEM ARCHITECTURE OF MOBILE ROBOT

(71) Applicants: Yujin Robot Co., Ltd., Incheon (KR); Miele & Cie. KG, Gütersloh (DE)

(72) Inventors: Seong Ju Park, Incheon (KR); Dong Hyeon Seo, Incheon (KR); Seung Ho Jang, Incheon (KR); Min Chang, Incheon (KR); Yun Jib Kim, Incheon (KR); Chang Woo Kim, Incheon (KR)

(73) Assignees: Yujin Robot Co., Ltd., Incheon (KR); Miele & Cie. KG, Gütersloh (DE)

( * ) Notice: Subject to any disclaimer, the term of this patent is extended or adjusted under 35 U.S.C. 154(b) by 445 days.

(21) Appl. No.: 18/316,909

(22) Filed: May 12, 2023

(65) Prior Publication Data

US 2024/0075622 A1    Mar. 7, 2024

Related U.S. Application Data

(63) Continuation-in-part of application No. PCT/KR2021/016526, filed on Nov. 12, 2021.

(30) Foreign Application Priority Data

Nov. 12, 2020 (KR) .................. 10-2020-0151001
Nov. 10, 2021 (KR) .................. 10-2021-0153766

(Continued)

(51) Int. Cl.
 G01S 17/931 (2020.01)
 B25J 9/16 (2006.01)
(Continued)

(52) U.S. Cl.
CPC .......... G01S 17/931 (2020.01); B25J 9/1653 (2013.01); B25J 9/1666 (2013.01); B25J 9/1676 (2013.01);
(Continued)

(58) Field of Classification Search
CPC .. G05D 1/0274; G05D 1/0238; G05D 1/0088; G05D 1/0214; G05D 1/0246;
(Continued)

(56) References Cited

U.S. PATENT DOCUMENTS 6,771,208 B2    8/2004 Lutter et al.
11,182,625 B2 * 11/2021 Lee ...................... G05D 1/0274
(Continued)

FOREIGN PATENT DOCUMENTS

KR    10-2008-0027675 A    3/2008
KR    10-2018-0061929 A    6/2018
(Continued)

OTHER PUBLICATIONS

Office Action for U.S. Appl. No. 18/316,927 by United States Patent and Trademark Office dated Apr. 8, 2025.
(Continued)

*Primary Examiner* — Mohammad K Islam
(74) *Attorney, Agent, or Firm* — BROADVIEW IP LAW, PC (57) ABSTRACT

A functional safety system of a robot according to an exemplary embodiment of the present disclosure can duplicate modules so as to satisfy a performance level d (pl-d) required for the functional satisfy of a robot.

14 Claims, 9 Drawing Sheets

(30) Foreign Application Priority Data

Nov. 10, 2021 (KR) ........................ 10-2021-0153767
Nov. 10, 2021 (KR) ........................ 10-2021-0153768

(51) Int. Cl.
  *B25J 13/08* (2006.01)
  *B25J 19/02* (2006.01)
  *G05D 1/00* (2024.01)
  *G05D 1/617* (2024.01)

(52) U.S. Cl.
  CPC ........... *B25J 13/089* (2013.01); *B25J 19/022* (2013.01); *G05D 1/0214* (2013.01); *G05D 1/617* (2024.01)

(58) Field of Classification Search
  CPC .... G05D 1/028; G05D 1/0231; G05D 1/0255; G05D 1/0044; G05D 1/0212; G05D 1/0295; G05D 2111/10; G05D 1/0077; G05D 1/0221; G05D 1/0223; G05D 1/0227; G05D 1/024; G05D 1/0251; G05D 1/0253; G05D 1/0257; G05D 1/0282; G05D 1/0285; G05D 1/0289; G05D 1/242; G05D 1/2427; G05D 1/243; G05D 1/246; G05D 1/2462; G05D 1/2465; G05D 1/247; G05D 1/249; G05D 1/617; G05D 1/622; G05D 1/628; G05D 1/81; G05D 1/2424; G05D 1/637; G05D 2109/10; G05D 2111/17; G01S 17/931; B25J 9/1653; B25J 9/1666; B25J 9/1676; B25J 13/089; B25J 19/022; B25J 11/008; G05B 2219/39091; G05B 2219/40476
  See application file for complete search history.

(56) References Cited

U.S. PATENT DOCUMENTS

| | | |
|---|---|---|
| 2005/0154503 A1 | 7/2005 | Jacobs et al. |
| 2016/0313364 A1 | 10/2016 | Kawai et al. |
| 2017/0025019 A1 | 1/2017 | Pink et al. |
| 2017/0144307 A1 | 5/2017 | Rublee |
| 2018/0173223 A1 | 6/2018 | Doane et al. |
| 2018/0321687 A1* | 11/2018 | Chambers ............... G06F 16/29 |
| 2018/0372875 A1 | 12/2018 | Juelsgaard et al. |
| 2019/0161274 A1 | 5/2019 | Paschall, II et al. |
| 2019/0262993 A1 | 8/2019 | Cole et al. |
| 2019/0272671 A1 | 9/2019 | Zhang et al. |
| 2019/0339714 A1* | 11/2019 | Kwak ....................... G01S 5/16 |
| 2020/0192341 A1 | 6/2020 | Weaver |
| 2021/0018927 A1 | 1/2021 | Ackerman et al. |
| 2021/0213619 A1 | 7/2021 | Hong |
| 2021/0220996 A1* | 7/2021 | Passot ..................... G05D 1/628 |
| 2022/0203531 A1* | 6/2022 | Yuguchi ................. B25J 9/1674 |

FOREIGN PATENT DOCUMENTS

| | | |
|---|---|---|
| KR | 10-2018-0099090 A | 9/2018 |
| KR | 10-1986919 B1 | 6/2019 |
| WO | 2021/208225 A1 | 10/2021 |

OTHER PUBLICATIONS

International Search Report for PCT/KR2021/016526 by Korean Intellectual Property Office dated Feb. 18, 2022.

* cited by examiner

APPARATUS AND METHOD FOR MODULARIZING DUPLEX SYSTEM ARCHITECTURE OF MOBILE ROBOT

CROSS-REFERENCE TO RELATED APPLICATIONS

This application is a Continuation-in-part of pending PCT International Application No. PCT/KR2021/016526 filed on Nov. 12, 2021, which claims priority to Korean Patent Application No. 10-2020-0151001 filed on Nov. 12, 2020, Korean Patent Application No. 10-2021-0153766 filed on Nov. 10, 2021, Korean Patent Application No. 10-2021-0153767 filed on Nov. 10, 2021, and Korean Patent Application No. 10-2021-0153768 filed on Nov. 10, 2021, in the Korean Intellectual Property Office, the entire contents of which are hereby incorporated by references in its entirety.

BACKGROUND

Field

The present disclosure relates to a functional safety system of a robot, and more particularly, to a duplex system architecture modularizing apparatus and method of a mobile robot which duplex a module to satisfy a performance level d (pl-d) required by robot functional safety.

Description of the Related Art

Ensure a safety of the robot, the duplexing of the module at a performance level (pl) related to the functional safety is being demanded. However, according to the related art, when an existing sensor is removed or a new sensor is added, there is a problem in that a system architecture needs to be changed according to the changed content to satisfy the performance level (pl) of the robot.

SUMMARY

An object to be achieved by the present disclosure is to provide an apparatus and a method for modularizing a duplex system architecture of a mobile robot which duplex the entire system architecture to satisfy a performance level d (pl-d) demanded by the functional system of a robot.

Other and further objects of the present disclosure which are not specifically described can be further considered within the scope easily deduced from the following detailed description and the effect.

In order to achieve the above-described objects, according to an aspect of the present disclosure, a duplex system architecture modularizing apparatus of a mobile robot includes an input unit which includes a plurality sensors mounted to sense obstacles located in the vicinity of a mobile robot; a logic unit which includes a plurality of logic boards corresponding to the sensors; a controller which processes a duplexing parameter of the sensors based on duplex setting information which divides the surrounding area of the mobile robot into a plurality of duplexing areas and the duplexing parameter including duplex allocation information for sensors allocated to the duplexing areas; and an output unit which outputs a result according to a logical operation of the logic unit.

Here, the duplexing parameter further includes at least two or more information selected from logic board identification information, sensor location information, and logic board type information.

Here, the duplex setting information further includes logic board identification information which is allocated differently according to each duplexing area and the controller generates the duplexing parameter in the unit of duplexing area or changes a duplexing parameter which has been generated.

Here, the duplexing parameter further includes a first pair of logic board type information, a first pair of logic board type information and a first pair of sensor location information for a first duplexing area and a second pair of logic board type information, a second pair of logic board type information, and a second pair of sensor location information for a second duplexing area, and when the controller processes the duplexing parameter, the duplexing parameter is changed according to the duplexing area.

Here, the duplexing area includes a first duplexing area and a second duplexing area which is adjacent to the first duplexing area and sensors allocated to the first duplexing area are different from each other and the first duplexing area and the second duplexing area may at least partially overlap.

Here, the output unit includes at least two OR gates and sets an input for at least two OR gates using the duplexing parameter based on an output of the plurality of logic boards and transmits an output value of at least two OR gates.

Here, the controller controls the output unit based on the duplex setting information to set the output of the logic board corresponding to a first pair of duplexing target sets to be input to the first OR gate and set the output of the logic board corresponding to the second pair of duplexing target sets to be input to the second OR gate.

Here, in the logic unit, a plurality of mounted logic boards is connected to one communication network.

Here, the duplex system architecture modularizing apparatus includes a duplex sensor operation determining unit which acquires sensor data for every duplexing target from the logic unit to determine a normal operation or an abnormal operation of the duplex sensor.

Here, the duplex sensor operation determining unit reviews a reliability by comparing two sensor data acquired for every duplexing target and when two sensor data is equal, it is determined that the reliability review has passed and when two sensor data is different, the reliability reviews has not passed.

Here, the duplex sensor operation determining device generates a defect diagnosis signal with respect to the abnormal sensor which does not pass the reliability review by considering at least one of whether to collect data, whether to normally supply the power, whether a sensor transmitter/receiver normally operates.

In order to achieve the above-described objects, according to an aspect of the present disclosure, a duplex system architecture modularizing method performed by a duplex system architecture modularizing apparatus including an input unit which includes a plurality sensors mounted to sense obstacles located in the vicinity of a mobile robot; a logic unit which includes a plurality of logic boards corresponding to the sensors; an output unit which outputs a result according to a logical operation of the logic unit; and a controller, the method comprising: inputting duplex setting information by a user; and processing a duplexing parameter of the sensors including duplexing allocation information for sensors allocated to each of the duplexing areas based on the duplex setting information.

Here, the duplexing parameter further includes at least two or more information selected from logic board identification information, sensor location information, and logic board type information.

Here, the duplex setting information further includes logic board identification information which is allocated differently according to each duplexing area and the controller generates the duplexing parameter in the unit of duplexing area or changes a duplexing parameter which has been generated.

Here, the duplexing parameter further includes a first pair of logic board type information, a first pair of logic board type information and a first pair of sensor location information for a first duplexing area and a second pair of logic board type information, a second pair of logic board type information, and a second pair of sensor location information for a second duplexing area, and when the controller processes the duplexing parameter, the duplexing parameter is changed according to the duplexing area.

Here, the output unit includes at least two OR gates and sets an input for at least two OR gates using the duplexing parameter based on an output of the plurality of logic boards and transmits an output value of at least two OR gates.

Here, the processing is configured by: controlling the output unit based on the duplex setting information to set the output of the logic board corresponding to a first pair of duplexing target sets to be input to the first OR gate and set the output of the logic board corresponding to the second pair of duplexing target sets to be input to the second OR gate.

Further, according to the apparatus and the method for modularizing a duplex system architecture of a mobile robot according to an exemplary embodiment of the present disclosure, in order to satisfy the performance level d (pl-d) demanded by the functional safety of the robot, the entire system architecture is duplexed to remove a sensor or add a new sensor without changing the entire system architecture.

The effects of the present invention are not limited to the technical effects mentioned above, and other effects which are not mentioned can be clearly understood by those skilled in the art from the following description.

DETAILED DESCRIPTION OF THE EMBODIMENT

Hereinafter, embodiments of the present invention will be described in detail with reference to the accompanying drawings. Advantages and features of the present disclosure, and methods for accomplishing the same will be more clearly understood from exemplary embodiments described below with reference to the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "~unit" used in the specification refers to a software or hardware component such as a field programmable gate array (FPGA) or an ASIC and "~unit" performs some functions. However, "~unit" is not limited to the software or the hardware. "~unit" may be configured to be in an addressable storage medium or may be configured to reproduce one or more processors. Accordingly, as an example, "~unit" includes components such as software components, object oriented software components, class components, and task components, processes, functions, attributes, procedures, subroutines, segments of a program code, drivers, a firmware, a microcode, a circuit, data, database, and data structures. A function which is provided in the components and "~units" may be combined with a smaller number of components and "~units" or divided into additional components and "~units".

Hereinafter, a functional safety system of a robot according to the present disclosure will be described in detail with reference to the accompanying drawing.

Figure 1:
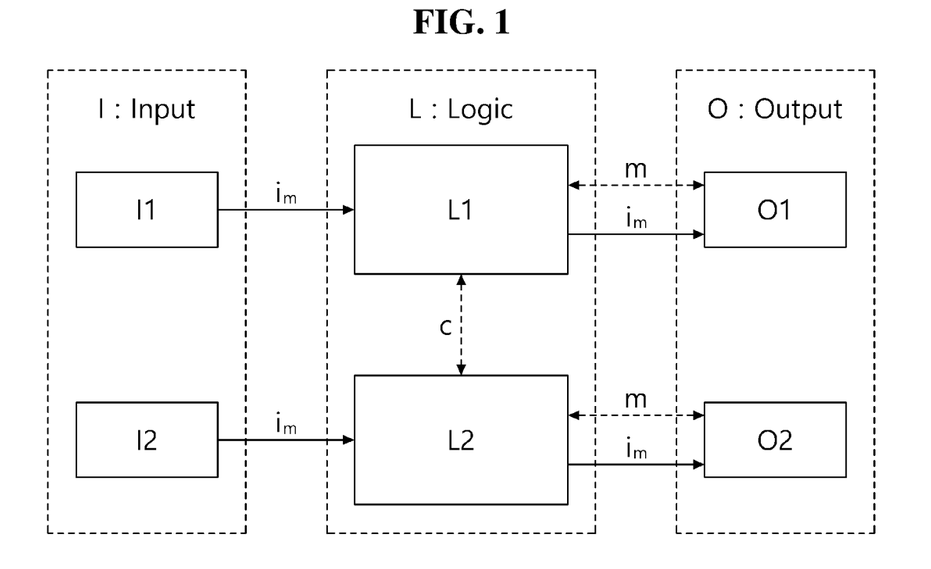
FIG. 1 is a view for explaining a duplexing concept for a performance level d with category 3 required by a robot functional safety.

FIG. 1 is a view for explaining a duplexing concept for a performance level d with category 3 required by a robot functional safety.

An apparatus and a method for modularizing a duplex system architecture of a mobile robot which is an exemplary embodiment of a functional safety system of a robot according to the present disclosure will be described in detail with reference to FIGS. 2 to 5.

First, an apparatus for modularizing a duplex system architecture of a mobile robot according to a second embodiment of the present disclosure will be described with reference to FIG. 2.

Figure 2:
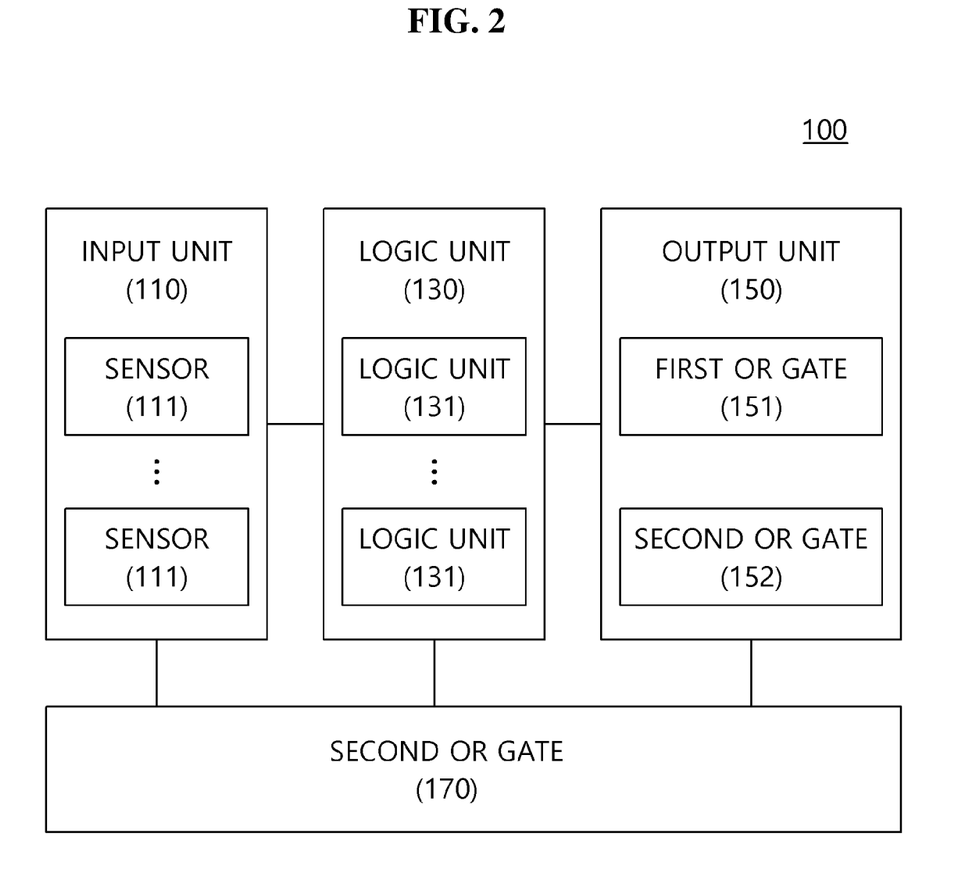
FIG. 2 is a block diagram for explaining an apparatus for modularizing a duplex system architecture of a mobile robot according to an exemplary embodiment of the present disclosure.

FIG. 2 is a block diagram for explaining an apparatus for modularizing a duplex system architecture of a mobile robot according to an exemplary embodiment of the present disclosure.

Referring to FIG. 2, the apparatus 100 for modularizing a duplex system architecture of a mobile robot according to an exemplary embodiment of the present disclosure (hereinafter, referred to as a "modularizing apparatus") may duplex the entire system architecture to satisfy the pl-d (performance level d) requested by the robot functional safety.

Here, the present disclosure is applicable to household cleaning robots, public building cleaning robots, logistics robots, service robots, as well as industrial robots.

In order to satisfy pl-d requested by the functional safety of the robot, as illustrated in FIG. 1, three module terminals including a input terminal I, a logic terminal L, and an output terminal O need to be duplexed. The input terminal is duplexed to a "LiDAR sensor A (I1)" and a LiDAR sensor B(I2)", the logic terminal is duplexed to a "LiDAR logic board A (L1)" and a "LiDAR logic board B(L2)", and the output terminal is duplexed to "O1" and "O2" and stops when the result is "0" or "2". The present disclosure relates to a method for performing the duplexing in view of the entire system architecture.

To this end, the modularizing apparatus 100 includes an input unit 110, a logic unit 130, an output unit 150, and a controller 170.

A plurality of sensors 111 may be mounted in the input unit 110.

Here, the sensor 111 may be one of a LiDAR sensor, an encoder sensor, and a cliff sensor.

In the logic unit 130, a plurality of logic boards 131 corresponding to the plurality of sensors 111 mounted in the input unit 110 may be mounted.

Here, the logic board 131 may be one of a LiDAR board, an encoder board, and the other (ETC) board.

The output unit 150 transmits an output value to the outside using a duplexing parameter based on outputs of the plurality of logic boards 131 mounted in the logic unit 130.

The controller 170 may change a value of the duplexing parameter based on duplexing target information input by the user.

Here, the duplexing parameter includes logic board identification information which is unique information to identify the logic board 131, logic board type information which is information to identify a type of the logic board 131, and sensor location information which is information to identify the location of the sensor 111.

Now, the duplex system architecture modularizing apparatus of a mobile robot according to a second embodiment of the present disclosure will be described in more detail with reference to FIG. 3.

Figure 3:
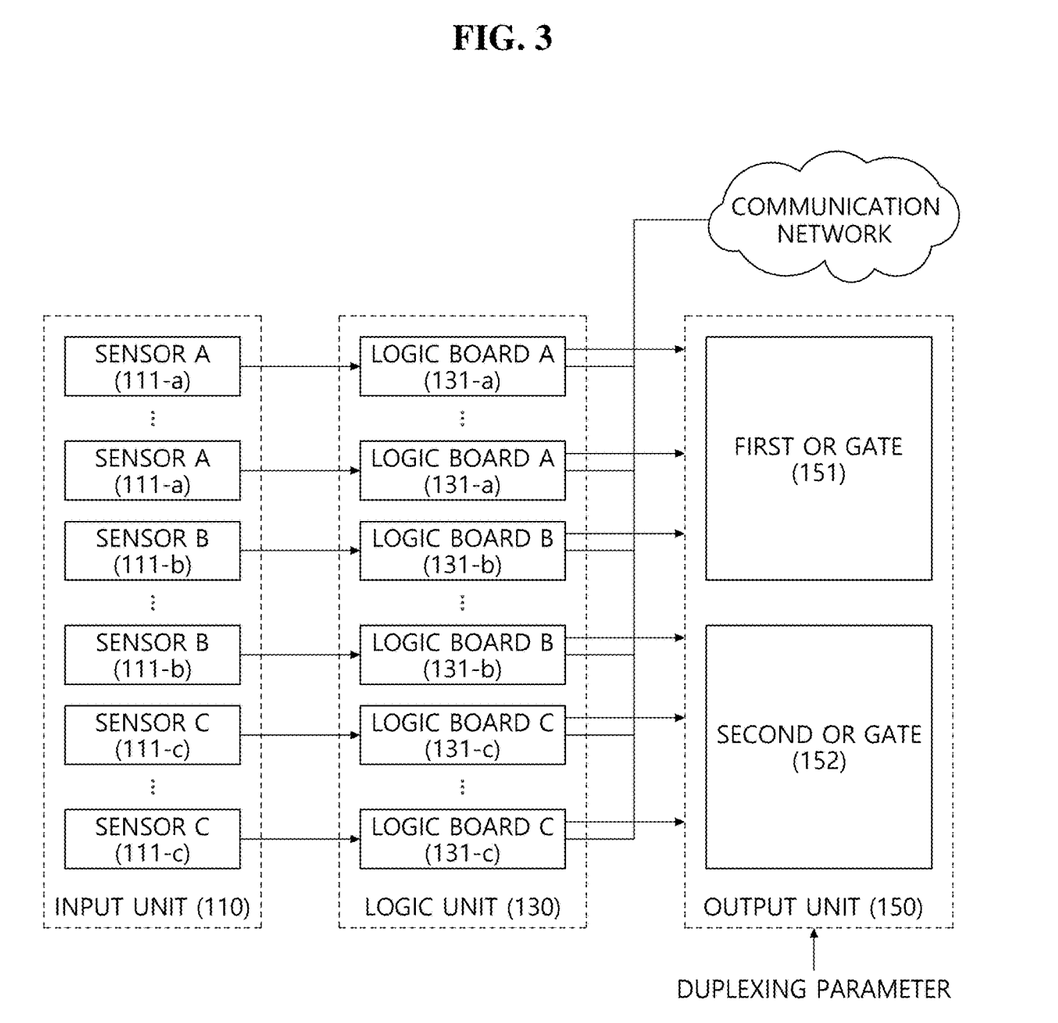
FIG. 3 is a block diagram for explaining a sub configuration of a duplex system architecture modularizing apparatus illustrated in FIG. 2.

FIG. 3 is a block diagram for explaining a sub configuration of a duplex system architecture modularizing apparatus illustrated in FIG. 2.

Referring to FIG. 3, in the input unit 110 of the modularizing apparatus 100 according to the present disclosure, a plurality of "type A" sensors A 111-*a* is mounted, a plurality of "type B" sensors B 111-*b* is mounted, and a plurality of "type C" sensors C 111-*c* is mounted. Here, the "type A" refers to the LiDAR sensor, the "type B" refers to an Encoder sensor, and the "type C" refers to the Cliff sensor.

The logic unit 130 of the modularizing apparatus 100 includes a plurality of "type A" logic boards A 131-*a* mounted corresponding to the plurality of sensors A 111-*a* mounted in the input unit 110, a plurality of "type B" logic boards B 131-*b* mounted corresponding to the plurality of sensors B 111-*b* mounted in the input unit 110, and a plurality of "type C" logic boards C 131-*c* mounted corresponding to the plurality of sensors C 111-*c* mounted in the input unit 110. Here, the "type A" refers to the LiDAR board, the "type B" refers to an Encoder board, and the "type C" refers to the Cliff board.

Further, the plurality of logic boards 131 mounted in the logic unit 130, that is, the plurality of logic boards A 131-*a*, the plurality of logic boards B 131-*b*, and the plurality of logic boards C 131-*c* are connected to one communication network.

When duplexing target information is input by the user, the controller 170 of the modularizing apparatus 100 changes the value of the duplexing parameter in the unit of the duplexing target set based on the duplexing target information. Here, the duplexing target information includes logic board identification information of a duplexing target and sensor information corresponding to the logic board of the duplexing target.

To be more specific, the controller 170 may change the value of the duplexing parameter including a first pair of logic board identification information, a first pair of logic board type information, a first pair of sensor location information, a second pair of logic board identification information, a second pair of logic board type information, and a second pair of sensor location information in the unit of duplexing target sets to dynamically changes the duplexing target.

At this time, the output unit 150 includes two OR gates 151 and 152 and sets inputs for two OR gates 151 and 152 using the duplexing parameter based on the output of the plurality of logic boards 131 and transmits the output values of two OR gates 151 and 152.

That is, the controller 170 controls the output unit 150 based on the duplexing target information to set the output of the logic board corresponding to the first pair of duplexing target sets to be input to the first OR gate and to set the output of the logic board corresponding to the second pair of duplexing target sets to be input to the second OR gate.

For example, the sensors A 111-*a* which are two LiDAR sensors, the sensors B 111-*b* which are two Encoder sensors, and the sensors C 111-*c* which are two Cliff sensors are installed in the input unit 110 and the logic board A 131-*a* which are two LiDAR boards corresponding to two sensors A 111-*a*, the logic board B 131-*b* which are two Encoder boards corresponding to two sensors B 131-*b*, and the logic boards C 131-*c* which are two ETC boards corresponding to two sensors C 111-*c* are installed, and then the duplexing target information as follows may be input.

Duplexing Target Information
  Duplexing target set 1: Identification information of two logic boards A 131-*a*, number of sensors 111 connected to two logic boards A 131-*a*, and identification information of sensor 111
  Duplexing target set 2: Identification information of two logic boards B 131-*b*, number of sensors 111 connected to two logic boards B 131-*b*, and identification information of sensor 111
  Duplexing target set 3: Identification information of two logic boards C 131-*c*, number of sensors 111 connected to two logic boards C 131-*c*, and identification information of sensor 110

By doing this, the controller 170 of the modularizing apparatus 100 according to the present disclosure changes the value of the duplexing parameter in the unit of duplexing target set as follows, based on the above duplexing target information to dynamically change the duplexing target.

Change Value of Duplexing Parameter
  Duplexing target set 1: A value of related duplexing parameter is changed with one logic board A 131-*a* between two logic boards A 131-*a* as a first pair and the other logic board A 131-*a* as a second pair to set two logic boards A 131-*a* as a duplexing target
  Duplexing target set 2: A value of related duplexing parameter is changed with one logic board B 131-*b* between two logic boards B 131-*b* as a first pair and the other logic board B 131-*b* as a second pair to set two logic boards B 131-*b* as a duplexing target
  Duplexing target set 3: A value of related duplexing parameter is changed with one logic board C 131-*c* between two logic boards C 131-*c* as a first pair and the other logic board C 131-*c* as a second pair to set two logic boards C 131-*c* as a duplexing target The controller 170 may set to input one logic board A 131-*a* between two logic boards A 131-*a* set as the first pair, one logic board B 131-*b* between two logic boards A 131-*b* set as the first pair, and one logic board C 131-*c* between two logic boards C 131-*c* set as the first pair to the first OR gate 151. Further, the controller 170 may set to input one logic board A 131-*a* between two logic boards A 131-*a* set as the second pair, one logic board B 131-*b* between two logic boards A 131-*b* set as the second pair, and one logic board C 131-*c* between two logic boards C 131-*c* set as the second pair to the second OR gate 152. By doing this, according to the present disclosure, the output terminal may be duplexed.

Now, an implementation example of a duplex system architecture modularizing apparatus of a mobile robot according to a second embodiment of the present disclosure will be described with reference to FIG. 4.

Figure 4:
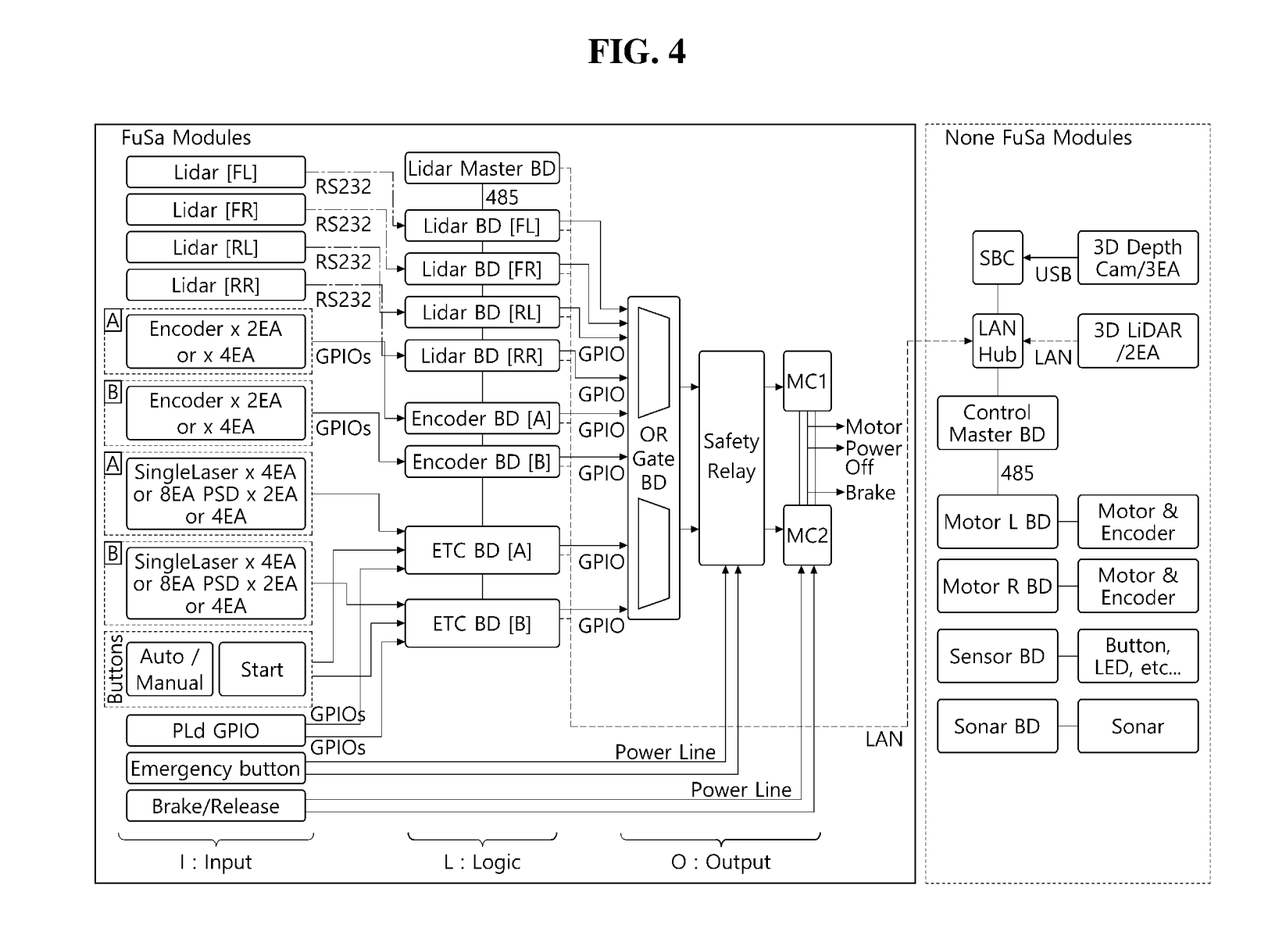
FIG. 4 is a view for explaining an implementation example of a duplex system architecture modularizing apparatus of a mobile robot according to an exemplary embodiment of the present disclosure.

FIG. 4 is a view for explaining an implementation example of a duplex system architecture modularizing apparatus of a mobile robot according to an exemplary embodiment of the present disclosure.

Referring to FIG. 4, according to the present disclosure, the entire system is configured by dividing an input terminal I, a logic terminal L, and an output terminal O and each logic board LB 131 is formed by one communication network to remove or add a module to the logic board LB 131 in accordance with the number of sensors 111 required for duplexing.

Further, in the output terminal, in order to flexibly receive data regardless of the number of two duplexed data, two OR gates 151 and 152 are configured so that even though the module of the logic board LB 131 is removed or newly added, the duplex system may be implemented without changing the entire system architecture.

That is, according to the present disclosure, the logic board LB 131 is configured for every sensor 111 to configure a duplex system in the unit of modules and the output terminal is duplexed using the output board (two OR gates) which are duplexed regardless of the number of output data from the entire logic terminals so that the pl-d architecture is possible without causing a big change of the entire duplex system architecture whenever the number of sensors 111 changes.

In the system architecture according to the present disclosure, the logic terminal is largely divided into three types: a LiDAR board, an encoder board, and an ETC board. At this time, the number of LiDAR sensors dynamically changes to two to four, the number of Encoder sensors dynamically changes to two to four, and the number of Cliff sensors dynamically changes to four to eight. The number of sensors 111 may change without separately changing the software in the board and the user may transmit the changed content to the corresponding board as data of the parameter. That is, the user may transmit the changed content to the corresponding board by inputting the duplexing target information.

When the user inputs the duplexing target information such as an ID number of the logic board 131 to be duplexed and the number of sensors 111, the corresponding board automatically changes a value of the following duplexing parameter based on the duplexing target information through an internal algorithm.

First Pair of Duplexing Parameters to be Duplexed
  ID of logic board 131: LB_PAIR_RS485_ID_1
  Type of logic board 131: LB_PAIR_EXTRINSIC_TYPE_1
  Location of sensor 111: LB_PAIR_LIDAR_LOCATION_XYZ_1/LB_PAIR_LIDAR_LOCATION_R_XYZ_1

Second Pair of Duplexing Parameters to be Duplexed
  ID of logic board 131: LB_PAIR_RS485_ID_2
  Type of logic board 131: LB_PAIR_EXTRINSIC_TYPE_2
  Location of sensor 111: LB_PAIR_LIDAR_LOCATION_XYZ_2/LB_PAIR_LIDAR_LOCATION_R_XYZ_2

In the internal board, the target to be duplexed may be dynamically changed by the duplexing parameter as described above. That is, according to the present disclosure, after changing the number of sensors to be changed in the unit of systems, when only the value of the duplexing parameter is changed in accordance therewith, the duplexing target is automatically changed.

Now, a method for modularizing a duplex system architecture of a mobile robot according to a second embodiment of the present disclosure will be described with reference to FIG. 5.

Figure 5:
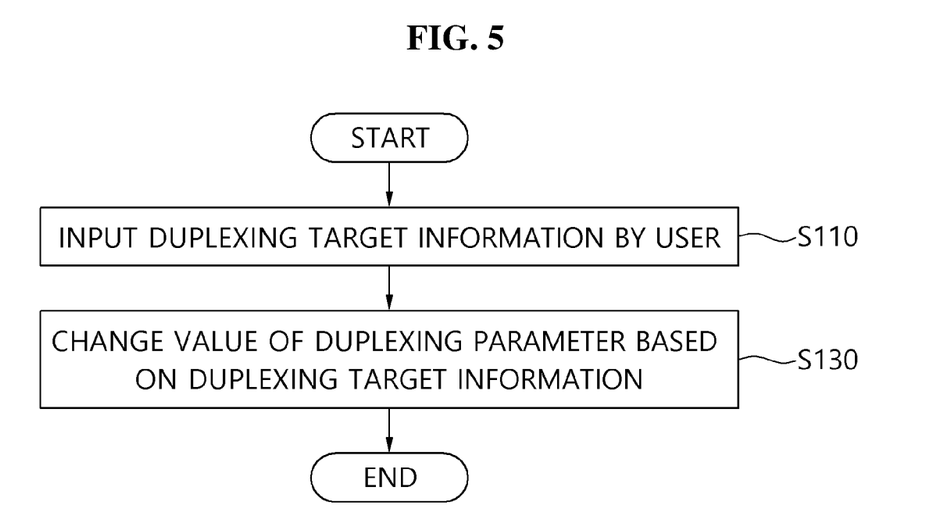
FIG. 5 is a flowchart for explaining a method for modularizing a duplex system architecture of a mobile robot according to an exemplary embodiment of the present disclosure.

FIG. 5 is a flowchart for explaining a method for modularizing a duplex system architecture of a mobile robot according to an exemplary embodiment of the present disclosure.

Referring to FIG. 5, the modularizing apparatus 100 according to the present disclosure inputs duplexing target information by a user (S110).

Here, the duplexing target information includes logic board identification information of a duplexing target and sensor information corresponding to the logic board of the duplexing target.

Next, the modularizing apparatus 100 changes the value of the duplexing parameter based on the duplexing target information (S130).

Here, the duplexing parameter includes logic board identification information which is unique information to identify the logic board 131, logic board type information which is information to identify a type of the logic board 131, and sensor location information which is information to identify the location of the sensor 111.

That is, when duplexing target information is input by the user, the modularizing apparatus 100 changes the value of the duplexing parameter in the unit of the duplexing target set based on the duplexing target information.

To be more specific, the modularizing apparatus 100 may change the value of the duplexing parameter including a first pair of logic board identification information, a first pair of logic board type information, a first pair of sensor location information, a second pair of logic board identification information, a second pair of logic board type information, and a second pair of sensor location information in the unit of duplexing target sets to dynamically changes the duplexing target.

At this time, the output unit 150 of the modularizing apparatus 100 includes two OR gates 151 and 152 and sets inputs for two OR gates 151 and 152 using the duplexing parameter based on the output of the plurality of logic boards 131 and transmits the output values of two OR gates 151 and 152 to the outside.

That is, the modularizing apparatus 100 controls the output unit 150 based on the duplexing target information to set the output of the logic board corresponding to the first pair of duplexing target sets to be input to the first OR gate and the output of the logic board corresponding to the second pair of duplexing target sets to be input to the second OR gate.

Figure 6:
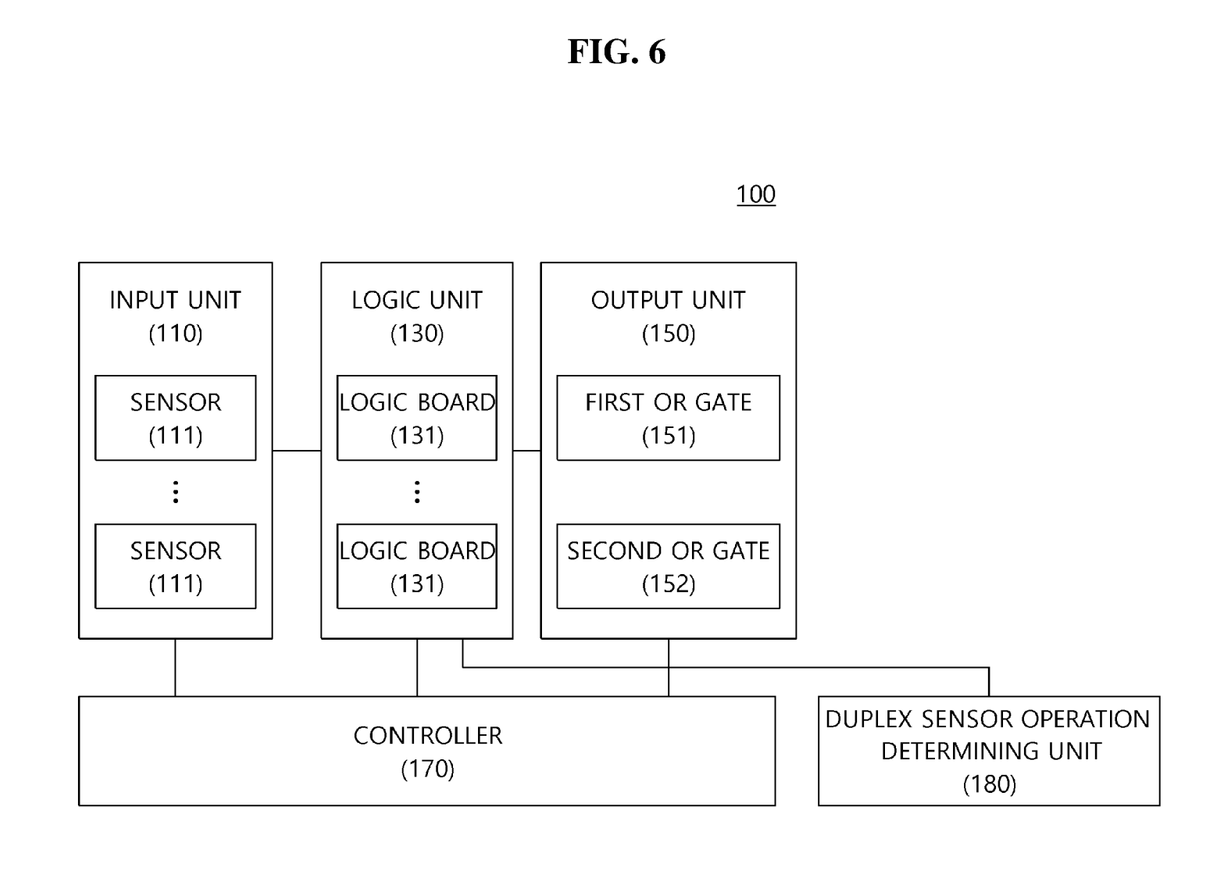
FIG. 6 is a block diagram schematically illustrating a duplex system architecture modularizing apparatus further including a duplex sensor operation determining unit according to an exemplary embodiment of the present disclosure.

FIG. 6 is a block diagram schematically illustrating a duplex system architecture modularizing apparatus further including a duplex sensor operation determining unit according to an exemplary embodiment of the present disclosure.

An input unit 110 of a modularizing apparatus 100 according to the exemplary embodiment includes a plurality of sensors mounted to sense an obstacle located in the vicinity of the mobile robot.

A logic unit 130 of the modularizing apparatus 100 includes a plurality of logic boards mounted so as to correspond to the sensors.

An output unit 150 of the modularizing apparatus 100 outputs a result according to a logical operation of the logic unit 150->130.

The controller 170 of the modularizing apparatus 700 processes a duplexing parameter of the sensors based on duplex setting information which divides the surrounding area of the mobile robot into a plurality of duplexing areas and the duplexing parameter includes duplex allocation information for sensors allocated to the duplexing areas.

The duplexing parameter further includes at least two or more information selected from logic board identification information, sensor location information, and logic board type information.

The duplex setting information further includes logic board identification information which is allocated differently according to each duplexing area.

The controller 170 generates a duplexing parameter in the unit of duplexing area or uses an already generated duplexing parameter.

The duplexing parameter further includes a first pair of logic board type information, a first pair of logic board type information and a first pair of sensor location information for a first duplexing area and a second pair of logic board type information, a second pair of logic board type information, and a second pair of sensor location information for a second duplexing area.

The processing of the duplexing parameter by the controller 170 further includes changing of the duplexing parameter according to the duplexing area.

The duplexing area includes a first duplexing area and a second duplexing area which is adjacent to the first duplexing area and sensors allocated to the first duplexing area are different from each other and the first duplexing area and the second duplexing area may at least partially overlap.

The signal processing in the overlapping area may be processed in different methods according to the number of sensors.

The logic board identification information related to the modularizing apparatus 100 refers to an unique value of a logic board for identifying the logic board. The logic board type information is identification information according to a type of a sensor. For example, a type of sensor includes a LiDAR sensor, an IR sensor, an ultrasound sensor, and a camera. The LiDAR sensor includes a 2D LiDAR sensor and a 3D LiDAR Sensor and the type information may be distinguished according to a resolution.

The sensor location information includes actual location information in which the sensor is mounted. The sensor location information is information specifying where the mobile robot is located and where the mobile robot is directed. The sensor location information may include information about a location coordinate, orientation information about a directed direction, and viewing angle direction.

A duplex system of the mobile robot may divide and recognize the surrounding environment for every area. A plurality of sensors is allocated to every divided duplexing area. One sensor may be allocated to cover one duplexing area or allocated to a plurality of adjacent duplexing areas.

A coverage area of the sensor may be larger than an allocated duplexing area and there may be a remaining area which is not allocated. The processor does not perform separate real-time processing for object recognition on a sensor value for the remaining area acquired by the sensor, but store the sensor value for the remaining area in a memory for a predetermined time.

When there is a sensor which is suspicious to be defective, among the sensors, if sensor values acquired for the object are different for the sensors, the processor further uses the sensor value for the remaining area to determine the defect of the sensor or determine the object recognition.

The duplex setting information is information for dividing the surrounding area of the mobile robot into a plurality of duplexing areas. The duplex setting information may be a value input by the user or may be a value which is adaptively generated and changed according to the traveling environment of the mobile robot. For example, when a plurality of front obstacles is sensed on the traveling path, in order to increase a sensing performance for the front area, it is necessary to divide the front area into more duplexing areas. When the duplex setting information is changed, the controller changes a duplexing parameter. That is, a combination of the duplexing area and a sensor may be configured in different forms.

The modularizing apparatus 100 according to the present disclosure further includes a duplex sensor operation determining unit 180.

The duplex sensor operation determining unit 180 determines a normal operation of an abnormal operation of the duplex sensor by interworking with the logic unit 130, the output unit 150, and the controller 170.

The duplex sensor operation determining unit 180 acquires sensor data for every duplexing target from the logic unit 130 and compares two acquired sensor data to review the reliability. According to the reliability review, if two sensor data is the same, it is determined that the reliability review has been passed and if two sensor data is different, it is determined the reliability review has not been passed.

The duplex sensor operation determining unit 180 performs duplexing verification on the duplexing target which has passed the reliability review through the output unit 150. Here, the duplexing verification means verifying whether the duplexing parameter for the duplexing target is normally output.

The duplex sensor operation determining unit 180 determines whether there is an abnormal sensor, that is, whether an abnormal sensor operates, by means of the reliability review or duplexing verification.

Thereafter, the duplex sensor operation determining unit 180 feeds back a defect diagnosis signal or a sensor correction signal to the controller 170.

Figure 7:
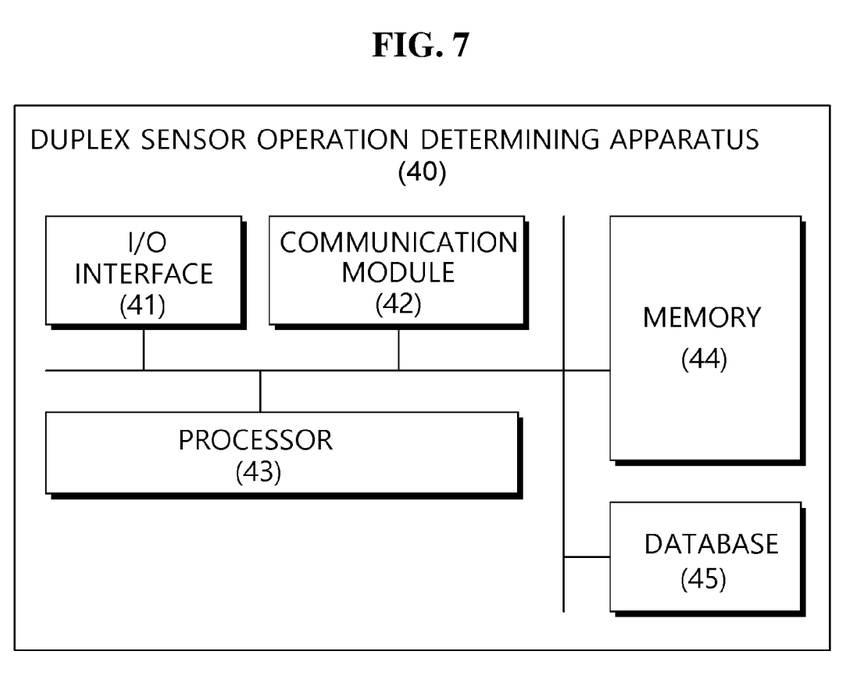
FIG. 7 is a block diagram schematically illustrating a duplex sensor operation determining device according to an exemplary embodiment of the present disclosure.

FIG. 7 is a block diagram schematically illustrating a duplex sensor operation determining device according to an exemplary embodiment of the present disclosure.

The duplex sensor operation determining device 40 according to the exemplary embodiment includes an I/O interface 41, a communication module 42, a processor 43, a memory 44, and a database 45. The duplex sensor operation determining device 40 of FIG. 7 is an example so that all blocks illustrated in FIG. 7 are not essential components and in the other exemplary embodiment, some blocks included in the duplex sensor operation determining device 40 may be added, modified, or omitted. In the meantime, the duplex sensor operation determining device 40 may be implemented by a computing device and each component included in the duplex sensor operation determining device 40 may be implemented by a separate software device or a separate hardware device in which the software is combined.

The duplex sensor operation determining device 40 according to the exemplary embodiment may be a device which performs the same function as the duplex sensor operation determining unit 180 of FIG. 6, but is not necessarily limited thereto, and may be a device corresponding to a partial function of the duplex sensor operation determining unit 180.

The communication module 42 refers to a means which receives or transmits a signal or data.

The communication module 42 interworks with the processor 43 to input various types of signals or data or directly acquires data by interworking with a device in the mobile robot or an external device to transmit the signal or data to the processor 43. For example, the communication module 42 may interwork with the logic unit 130, the output unit 150, and the controller 170.

Further, the communication module 42 transmits the signal or data generated in the processor 43 to the device in the mobile robot 10 or an external device (for example, a server).

The communication module 42 may be connected to the I/O interface 41. The I/O interface 41 transmits information acquired from the communication module 42 to the processor 43 or receives a control signal from the processor 43 to substantially convert the information or the control signal into a signal for controlling the communication module 42.

The processor 43 according to the exemplary embodiment determines a normal operation or an abnormal operation of the duplex sensor.

The processor 43 performs an operation corresponding to all or a part of an operation performed by the duplex sensor operation determining unit 180.

The processor 43 compares two sensor data acquired for every duplexing target to perform the reliability review.

Further, the processor 43 performs the duplexing verification on the duplexing target which has passed the reliability review.

Further, the processor 43 determines whether there is an abnormal sensor, that is, whether an abnormal sensor operates, by means of the reliability review or duplexing verification.

Further, the processor 43 feeds back the defect diagnosis signal or the sensor correction signal.

The memory 44 includes at least one instruction or program which is executable by the processor 43. The memory 44 includes instructions or programs for controlling the mobile robot 10 and determining an operation of a sensor.

The database 45 refers to a general data structure implemented in a storage space (a hard disk or a memory) of a computer system using a database management program (DBMS) and means a data storage format which freely searches (extracts), deletes, edits, or adds data. The database 150 may be implemented according to the object of the exemplary embodiment of the present disclosure using a relational database management system (RDBMS) such as Oracle, Informix, Sybase, or DB2, an object oriented database management system (OODBMS) such as Gemston, Orion, or O2, and XML native database such as Excelon, Tamino, Sekaiju and has an appropriate field or elements to achieve its own function. In the meantime, the database 45 may be implemented as cloud or a virtual memory.

The database 45 according to the exemplary embodiment stores and provides information about control of the mobile robot 10, information about the safety area, the defect diagnosis signal, and the sensor correction signal.

It has been described that the database 45 is implemented in the duplex sensor operation determining device 40, but is not necessarily limited thereto and may be implemented as a separate data storage device.

Figure 8:
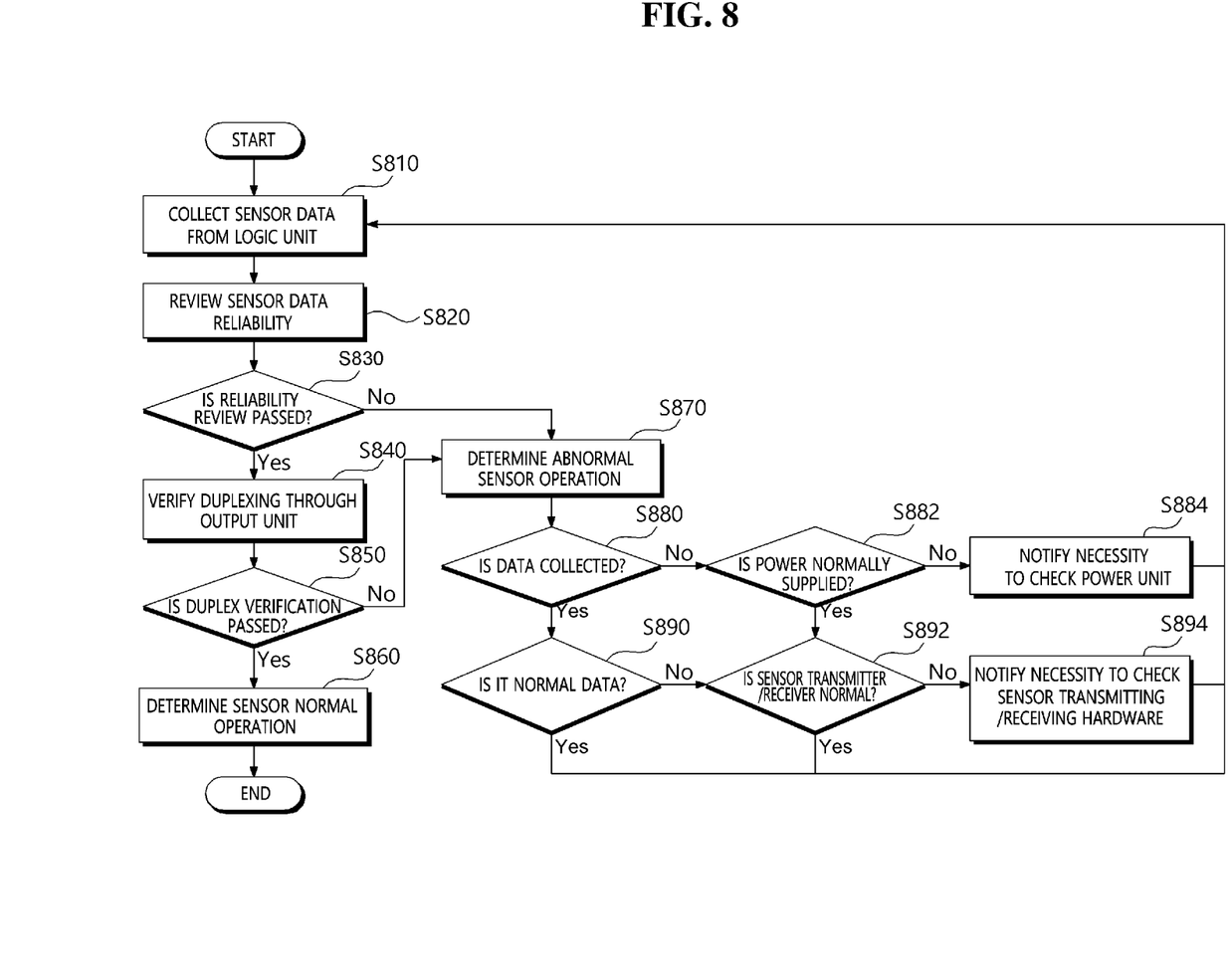
FIG. 8 is a flowchart for explaining a duplex sensor operation determining method according to an exemplary embodiment of the present disclosure.

FIG. 8 is a flowchart for explaining a duplex sensor operation determining method according to an exemplary embodiment of the present disclosure.

The duplex sensor operation determining device 40 acquires sensor data for every duplexing target from the logic unit 130 (S810) and compares two acquired sensor data to review the reliability. According to the reliability review, if two sensor data is the same, it is determined that the reliability review has passed and if two sensor data is different, it is determined the reliability review has not been passed.

The duplex sensor operation determining unit 40 performs duplexing verification on the duplexing target which has passed the reliability review through the output unit 150 (S840). Here, the duplexing verification means verifying whether the duplexing parameter for the duplexing target is normally output.

When the duplexing review has been passed (S850), the duplex sensor operation determining device 40 determines that the duplex sensor normally operates (S860).

In the meantime, when the reliability review of step S830 or the duplexing verification of step S850 has not been passed, the duplex sensor operation determining device 40 determines that there is an operation of the abnormal sensor (S870). That is, it is determined that there is an abnormal sensor.

The duplex sensor operation determining device 40 may generate a defect diagnosis signal by considering whether to collect data, whether to normally supply the power, whether a sensor transmitter/receiver normally operates.

Specifically, when data for the abnormal sensor is not collected (S880) and the power is abnormally supplied (S882), the duplex sensor operation determining device 40 generates a defect diagnosis signal including notification information about necessity to check a power unit of an abnormal antenna (S884).

In the meantime, when the data for the abnormal sensor is collected (S880), the data is normal data in which a data format does not have an error (S890), and the sensor transmitter/receiver is in an abnormal operation state (S894), the duplex sensor operation determining device 40 generates a defect diagnosis signal including notification information about necessity to check hardware of the sensor transmitter/receiver of the abnormal antenna (S894).

Even though in FIG. 8, it is described that the steps are sequentially performed, the present invention is not necessarily limited thereto. In other words, the steps illustrated in FIG. 8 may be changed or one or more steps may be performed in parallel so that FIG. 8 is not limited to a time-series order.

The duplex sensor operation determining method according to the exemplary embodiment described in FIG. 8 may be implemented by an application (or a program) and may be recorded in a terminal (or computer) readable recording media. The recording medium which has the application (or program) for implementing the duplex sensor operation determining method according to the exemplary embodiment recorded therein and is readable by the terminal device (or a computer) includes all kinds of recording devices or media in which computing system readable data is stored.

Figure 9:
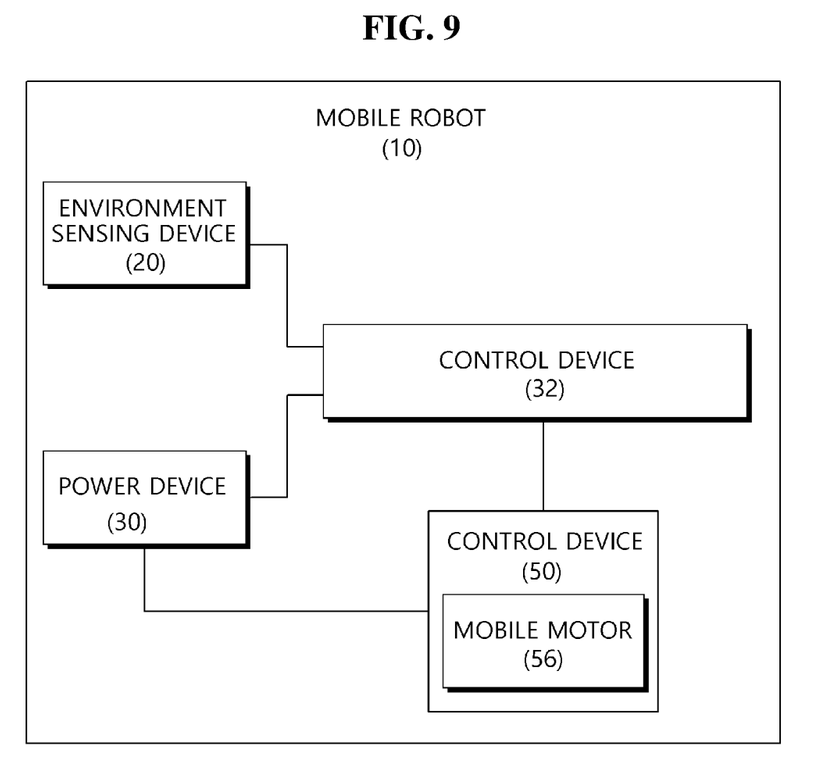
FIG. 9 is a block diagram schematically illustrating a mobile robot according to an exemplary embodiment of the present disclosure.

FIG. 9 is a block diagram schematically illustrating a mobile robot according to an exemplary embodiment of the present disclosure.

A mobile robot 10 according to the exemplary embodiment of the present disclosure includes an environment sensing device 20, a power device 30, a control device 32, and a driving device 50. The mobile robot 10 of FIG. 9 is an example so that all blocks illustrated in FIG. 9 are not essential components and in the other exemplary embodiment, some blocks included in the mobile robot 10 may be added, modified, or omitted.

The mobile robot 10 according to the exemplary embodiment may be household cleaning robots, public building cleaning robots, logistics robots, service robots, and industrial robots.

The environment sensing device 20 refers to a device which senses motion information, surrounding obstacle information, and floor state information for the mobile robot 10.

The environment sensing device 20 includes a plurality of sensors and includes various sensors, such as a LiDAR sensor, a radar sensor, an image sensor, an IR sensor, and an ultrasonic sensor. Here, different sensors which are directed to an arbitrary duplexing area may be the same sensor, or the same type of sensors, or different types of sensors.

The environment sensing device 20 transmits information sensed by the plurality of sensors to the control device 32.

The power device 30 stores and supplies a power for an operation of the mobile robot 10.

The power device 30 applies a power while interworking with various configurations required to be applied with the power in the mobile robot 10.

The power device 30 may be implemented as a battery, but is not limited thereto.

The control device 32 performs an operation of controlling an overall operation of the mobile robot 10.

The control device 32 determines an operation of the duplex sensor of the mobile robot 10. The control device 32 determines a normal operation or an abnormal operation of the duplex sensor.

Further, the control device 32 performs the feedback on the defect diagnosis signal or the sensor correction signal.

An operation of the control device 32 which determines the operation of the duplex sensor is the same as those described in FIGS. 6 to 8 so that a detailed description will be omitted.

Further, the control device 32 controls the driving of the mobile robot 10. The control device 32 generates an operation control signal based on the safety area and transmits the generated operation control signal to at least one motor included in the driving device 50 to control a driving force of the motor, thereby controlling the operation of the mobile robot 10.

The driving device 50 refers to a device including at least one motor equipped in the mobile robot 10. The driving device 50 may include various types of motors related to the operation of the mobile robot 10.

The driving device 50 according to the exemplary embodiment may include a mobile motor 56, but is not necessarily limited thereto and may further include various motors according to the type of the mobile robot 10.

The movement motor 56 is a motor for rotating main wheels (not illustrated) of the mobile robot 10 and is connected to the main wheels (not illustrated) and generates a driving force to rotate the main wheels (not illustrated).

The movement motor 56 rotates the main wheels (not illustrated) to move the mobile robot 10 along the movement path set by the control device 32 of the mobile robot 10.

Further, the movement motor 56 adaptively adjusts a driving force to rotate the main wheels so as to correspond to a movement speed or a size of the safety area based on the operation control signal received from the control device 32.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protective scope of the present disclosure should be construed based on the following claims, and all the technical concepts in the equivalent scope thereof should be construed as falling within the scope of the present disclosure.

What is claimed is:

1. A duplex system architecture modularizing apparatus of a mobile robot, comprising:
    an input unit which includes a plurality sensors mounted to sense obstacles located in the vicinity of a mobile robot;
    a logic unit which includes a plurality of logic boards corresponding to the sensors;
    a controller which processes a duplexing parameter of the sensors based on duplex setting information which divides the surrounding area of the mobile robot into a plurality of duplexing areas and the duplexing parameter including duplex allocation information for sensors allocated to the duplexing areas; and
    an output unit which outputs a result according to a logical operation of the logic unit,
    wherein the output unit includes at least two OR gates and sets an input for at least two OR gates using the duplexing parameter based on an output of the plurality of logic boards and transmits an output value of at least two OR gates,
    wherein the controller controls the output unit based on the duplex setting information to set the output of the logic board corresponding to a first pair of duplexing target sets to be input to the first OR gate and set the output of the logic board corresponding to the second pair of duplexing target sets to be input to the second OR gate.

2. The duplex system architecture modularizing apparatus according to claim 1, wherein the duplexing parameter further includes at least two or more information selected from logic board identification information, sensor location information, and logic board type information.

3. The duplex system architecture modularizing apparatus according to claim 1, wherein the duplex setting information further includes logic board identification information which is allocated differently according to each duplexing area and the controller generates the duplexing parameter in the unit of duplexing area or changes a duplexing parameter which has been generated.

4. The duplex system architecture modularizing apparatus according to claim 2, wherein the duplexing parameter further includes a first pair of logic board type information, a first pair of logic board type information and a first pair of sensor location information for a first duplexing area and a second pair of logic board type information, a second pair of logic board type information, and a second pair of sensor location information for a second duplexing area, and when the controller processes the duplexing parameter, the duplexing parameter is changed according to the duplexing area.

5. The duplex system architecture modularizing apparatus according to claim 1, wherein the duplexing area includes a first duplexing area and a second duplexing area which is adjacent to the first duplexing area and sensors allocated to the first duplexing area are different from each other and the first duplexing area and the second duplexing area may at least partially overlap.

6. The duplex system architecture modularizing apparatus according to claim 1, wherein in the logic unit, a plurality of mounted logic boards is connected to one communication network.

7. The duplex system architecture modularizing apparatus according to claim 1, further comprising:
    a duplex sensor operation determining unit which acquires sensor data for every duplexing target from the logic unit to determine a normal operation or an abnormal operation of the duplex sensor.

8. The duplex system architecture modularizing apparatus according to claim 7, wherein the duplex sensor operation determining unit reviews a reliability by comparing two sensor data acquired for every duplexing target and when two sensor data is equal, it is determined that the reliability review has passed and when two sensor data is different, the reliability reviews has not passed.

9. The duplex system architecture modularizing apparatus according to claim 8, wherein the duplex sensor operation determining device generates a defect diagnosis signal with respect to the abnormal sensor which does not pass the reliability review by considering at least one of whether to collect data, whether to normally supply the power, whether a sensor transmitter/receiver normally operates.

10. A duplex system architecture modularizing method performed by a duplex system architecture modularizing apparatus including an input unit which includes a plurality sensors mounted to sense obstacles located in the vicinity of a mobile robot; a logic unit which includes a plurality of logic boards corresponding to the sensors; an output unit which outputs a result according to a logical operation of the logic unit; and a controller, the method comprising:
    inputting duplex setting information by a user; and
    processing a duplexing parameter of the sensors including duplexing allocation information for sensors allocated to each of the duplexing areas based on the duplex setting information,
    wherein the output unit includes at least two OR gates and sets an input for at least two OR gates using the duplexing parameter based on an output of the plurality of logic boards and transmits an output value of at least two OR gates,
    wherein the processing is configured by: controlling the output unit based on the duplex setting information to set the output of the logic board corresponding to a first pair of duplexing target sets to be input to the first OR gate and set the output of the logic board corresponding to the second pair of duplexing target sets to be input to the second OR gate.

11. The duplex system architecture modularizing method according to claim 10, wherein the duplexing parameter further includes at least two or more information selected from logic board identification information, sensor location information, and logic board type information.

12. The duplex system architecture modularizing method according to claim 10, wherein the duplex setting information further includes logic board identification information which is allocated differently according to each duplexing area and the controller generates the duplexing parameter in the unit of duplexing area or changes a duplexing parameter which has been generated.

13. The duplex system architecture modularizing method according to claim 11, wherein the duplexing parameter further includes a first pair of logic board type information, a first pair of logic board type information and a first pair of sensor location information for a first duplexing area and a second pair of logic board type information, a second pair of logic board type information, and a second pair of sensor location information for a second duplexing area, and when the controller processes the duplexing parameter, the duplexing parameter is changed according to the duplexing area.

14. A non-transitory computer program stored in a computer readable recording medium to allow a computer to execute a duplex system architecture modularizing method of a mobile robot according to claim 10.

\* \* \* \* \*